Jan. 12, 1932.  C. BREER  1,840,655

VIBRATION DAMPENER

Filed Jan. 24, 1927

INVENTOR
CARL BREER.
BY
ATTORNEY

Patented Jan. 12, 1932

1,840,655

UNITED STATES PATENT OFFICE

CARL BREER, OF DETROIT, MICHIGAN, ASSIGNOR TO CHRYSLER CORPORATION, OF HIGHLAND PARK, MICHIGAN, A CORPORATION OF DELAWARE

VIBRATION DAMPENER

Application filed January 24, 1927. Serial No. 163,118.

My invention has to do with the elimination of vibrations which are manifested in the crankshafts of internal combustion engines and has for its main object the provision of means which will substantially eliminate the same at all speeds of rotation of the shaft.

Heretofore the practice has been to provide a slipping ring or over running clutch on the crankshaft designed to eliminate vibration at a particular speed but devices of this character are not entirely satisfactory for all periods of vibration.

An important object of the invention is to provide a dampener having a ring connected to rotate with the crankshaft through frictionally engaged surfaces and to provide for varying the amount of frictional grip in proportion to the speed of rotation of the crankshaft.

Another object of the invention is to use centrifugal force effects which build up the pressure between the frictionally engaged surfaces as the crankshaft speed is increased to thereby cause them to function for eliminating vibrations at all speeds.

A further object of the invention is to provide a vibration dampening device of simple and practical construction, and one in which the parts are few, easily removed and replaced.

The above and other objects of the invention will more fully appear from the following description taken in connection with the accompanying drawings in which.

Figure 1:
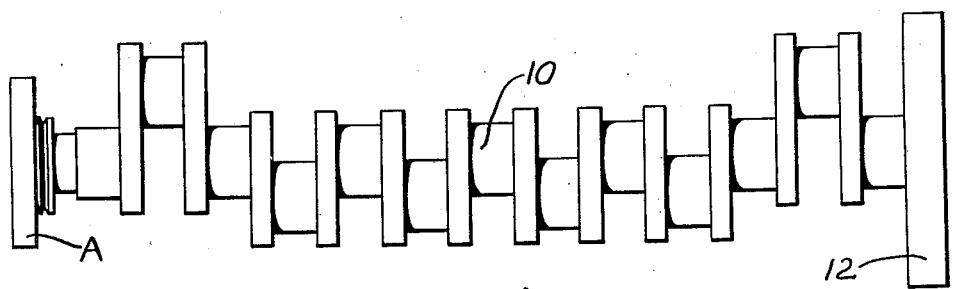
Fig. 1 is a side elevation of a crankshaft and flywheel embodying the invention.
Figures 2, 3:
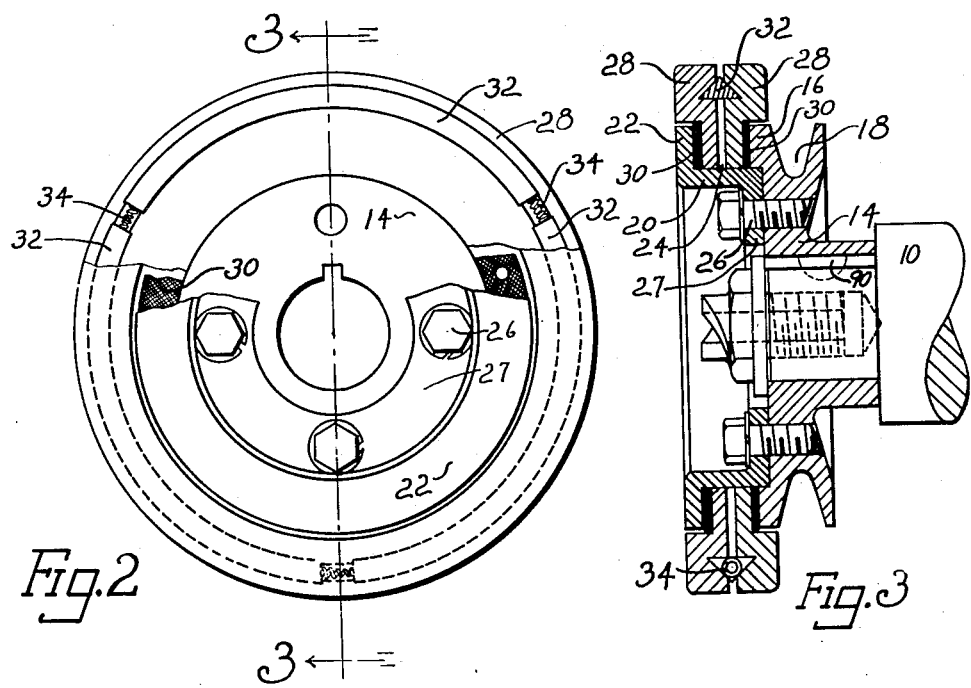
Fig. 2 is an end view of the dampener, parts being broken away.
Fig. 3 is a sectional view on line 3—3 of Fig. 2.

Referring to an illustrated embodiment of my invention, a crank shaft 10 has been shown provided with a flywheel 12 at one end thereof and a dampener A at the opposite end thereof.

The dampener A comprises a hub member 14 secured to the crank shaft 10 as by the key 90 and adapted to rotate therwith. The hub 14 is provided with a radial integral plate portion or flange 16 which may be grooved as at 18 to form a fan belt pulley. A retaining member 20 is provided with a radial flange 22 opposite the flange 16 and spaced therefrom to form an annular groove 24. The retaining member 20 is secured to the hub 14 by bolts 26 extending through a flange 27 and screw threaded to the hub 14. A pair of inertia rings 28 are mounted in the annular groove 24 and rings 30, of frictional material, are arranged between the opposed faces of the flanges 22 and 16 and the rings 28.

In order to overcome a wide range of crankshaft torsional vibration it is necessary to carry a low pressure between the inertia rings 28 at extremely low speeds, such as to permit the rings 28 to freely slip with respect to the crankshaft, and to increase that pressure in proportion to the increased speed of rotation of the crankshaft so that the rings are more firmly held against the rotating faces.

The method illustrated for varying the pressure of the rings against the frictional surfaces is to insert betweeen the two rings 28 a split or segmental ring 32. This ring, in cross section, is triangular with its two sides tapered and so arranged as to produce a wedging action between the two rings 28 when rotated due to centrifugal force. Thus it will be understood that as the speed is increased more pressure is exerted on the rotating flanges 22 and 16, thereby increasing the frictional grip making the relative slip more difficult for the higher speeds.

Springs 34 have been placed between the adjacent ends of the ring to prevent rattle and to place an initial tension on the frictional surfaces through the wedging action. The wedge angle of the ring should be greater than the friction component angle such that the ring automatically releases its pressure as the engine speed decreases.

It will be understood that while but one form of the invention is shown and described, various modifications may be made without departing from the spirit of my invention and it is not my intention to limit its scope other than by the terms of the appended claims.

What I claim is:

1. In a device of the class described, in combination, a rotatable member, a pair of spaced radial faces on said rotatable member, inertia members adapted for frictional engagement with said faces, and an annular resilient member between said inertia members for exerting a pressure between said members and said faces and exerting an increased pressure when said parts are rotated.

2. In a vibration dampener comprising in combination, a rotatable member having a pair of separated radial flanges, inertia disks between said flanges rotatable relatively thereto and having friction surfaces to form a frictional driving connection between said disks and said flanges, and means arranged between said inertia members for yieldingly separating the disks.

3. In a vibration dampener comprising in combination, a rotatable member having a pair of separated radial flanges, spaced inertia members between said flanges rotatable relatively thereto, and means arranged between said members to form a driving connection between said members and said flanges, said means varying its pressure in proportion to the speed of rotation.

4. In a vibration dampener comprising in combination, a rotatable member having a pair of separated radial flanges, spaced inertia members between said flanges for frictional engagement therewith to form a driving connection between said flanges and said members, and a split ring having tapered sides between and in engagement with said inertia members to produce a wedging action due to centrifugal force when the members are rotated.

5. In a vibration dampener comprising in combination, a rotatable member having a pair of separated radial flanges, spaced inertia members between said radial flanges for frictional engagement therewith to form a driving connection with said members, a segmental ring having tapered sides between and in engagement with said inertia members to produce a wedging action due to centrifugal force when the members are rotated, and a spring between the ends of the segments of said ring to exert an initial pressure against said members.

6. In a vibration dampener comprising in combination, a crank shaft, a radial extending flange secured to said crankshaft, a radially extending flange detachably secured to said first mentioned flange and spaced therefrom to form an annular groove, a two part inertia ring relatively rotatable in said groove having friction surfaces for engagement with the sides of said groove, said inertia ring being supported at the base of said groove, and means between the two parts of said inertia ring for varying the amount of frictional engagement dependent on the speed of rotation of said radial flanges and said crankshaft.

7. In a vibration dampener, comprising in combination, a crank shaft, a fan belt pulley secured to said crankshaft, a radially extending flange detachably secured to said pulley and spaced therefrom to form an annular groove between said pulley and said flange, a two part inertia ring relatively rotatable in said groove, frictional members between said ring and the sides of said groove, and means relatively rotatable with said crankshaft for varying the amount of frictional engagement when the crankshaft is rotated, said means being between the two parts of the inertia ring.

8. In a vibration dampener comprising in combination, a crankshaft, a pulley secured to said crankshaft, a radially extending flange detachably secured to said pulley and spaced therefrom to form an annular groove between the wall of said pulley and said flange, spaced inertia members between the walls of said groove for frictional engagement therewith to form a driving connection with said members, and means, to produce a wedging action due to centrifugal force between said spaced inertia members when the crankshaft is rotated.

9. In a vibration dampener of the class described comprising, a rotatable member, an annular groove in the outer periphery of said member, spaced inertia members in said groove and having friction surfaces for engagement with the side walls of said groove, and a split ring having tapered sides between and in engagement with said inertia members to produce a wedging action due to centrifugal force when the members are rotated, said tapered sides having an angle greater than the frictional component angle such that the ring automatically releases its pressure as the speed of rotation decreases.

10. In a device of the class described comprising in combination, a crankshaft, a pair of adjacent inertia members relatively rotatable with said crankshaft, radial flanges at the outer sides of said inertia members rotatable with said crankshaft and a wedge between said inertia members adapted for radial movement by the action of centrifugal force to urge said inertia members apart against said flanges.

CARL BREER.